United States Patent

[11] 3,588,545

[72] Inventor Carl Macey Wright Cinnaminson, N.J.
[21] Appl. No. 875,711
[22] Filed Nov. 12, 1969
[45] Patented June 28, 1971
[73] Assignee RCA Corporation

[54] J-K' FLIP-FLOP USING DIRECT COUPLED GATES
8 Claims, 3 Drawing Figs.

[52] U.S. Cl. 307/289, 307/215, 307/218, 328/206
[51] Int. Cl. H03k 3/12
[50] Field of Search 307/289, 291, 215, 218; 328/206

[56] References Cited
UNITED STATES PATENTS

| | | | |
|---|---|---|---|
| 3,284,645 | 11/1966 | Eichelberger et al. | 307/289X |
| 3,467,839 | 9/1969 | Miller | 328/206X |
| 3,482,172 | 12/1969 | Turecki et al. | 307/291X |

*Primary Examiner*—John S. Heyman
*Attorney*—H. Christoffersen

ABSTRACT: Unclocked JK-type flip-flop using only direct-coupled logic gates. Activating signals applied to either of two inputs cause the flip-flop to assume a state corresponding to the activated input. Activating signals applied to both inputs simultaneously cause the flip-flop to change state.

INVENTOR
CARL M. WRIGHT
BY H. Christoffersen
Attorney

INVENTOR
CARL M. WRIGHT
BY H. Christoffersen
Attorney

J-K' FLIP-FLOP USING DIRECT COUPLED GATES

BACKGROUND OF THE INVENTION

Circuits having two mutually exclusive stable states are useful in digital control circuits and data-processing machines. Such circuits, usually called flip-flops, are capable of storing one bit of information and are used as a memory element, indicating which of two inputs of the circuit was most recently activated. There are several types of bistable flip-flops.

The simplest bistable flip-flop is the set-reset type (SR). A signal pulse on the set input causes the flip-flop to assume a stable set state that is maintained until a signal pulse is applied to the reset input, causing the flip-flop to assume a stable reset state. An example of the SR flip-flop is the Eccles-Jordan cross-coupled circuit. Simultaneous activation of the reset and set inputs of an SR flip-flop results in an undefined output state, limiting the applicability of the circuit.

A second type of bistable flip-flop is the set-reset-trigger type (SRT). In the SRT flip-flop, the S and R inputs are used the same way as in the SR flip-flop. In addition, a trigger input (T) is provided which, when activated changes the state of the flip-flop. That is, when the flip-flop is in the set state, a trigger pulse changes the flip-flop to the reset state. When the flip-flop is in the reset state, a trigger signal changes the flip-flop to the set state. As in the SR flip-flop, the output states of the SRT flip-flop are undefined when the S and R inputs are activated simultaneously.

A third type of bistable flip-flop is the data flip-flop (D). The D flip-flop has two inputs. One input is a timing or clock pulse input. THe other input is a signal representing data to be stored. At the time the clock pulse is applied to one input, a signal present on the data input causes the flip-flop to assume a set state. If no data is present on the data input when the clock pulse occurs, the flip-flop assumes the reset state.

A fourth type of bistable flip-flop is the JK flip-flop. The appiication of a signal to the J input causes the flip-flop to assume the set state. The application of a signal to the K input causes the flip-flop to assume the reset state. Simultaneous activation of both inputs causes the flip-flop to change state. Therefore, the JK flip-flop is similar to the SR type when the inputs are used separately but operates like the T input of the SRT flip-flop when both inputs are activated simultaneously. JK flip-flops are usually supplied with a clock input. The input signal conditions affect the flip-flop state only as they are present at the occurrence of a clock pulse. The requirement for a clock input limits the use to synchronous circuits.

An object of the invention is to provide a simple direct-coupled flip-flop of the JK type that does not require a clock pulse.

BRIEF DESCRIPTION OF THE INVENTION

A logic network having input signals J and K' and feedback signals E, Q, and Q', has a first set of gates for producing signals A=JQ, B=K'E, C=JK', and D=Q'J. A second set of gates produces from the A, B, C, and D signals the feedback signals.

$$Q=A+B$$

$$E=B+C+D.$$

The feedback signal Q' is derived from the feedback signal Q.

DETAILED DESCRIPTION OF THE INVENTION

Figure 1:
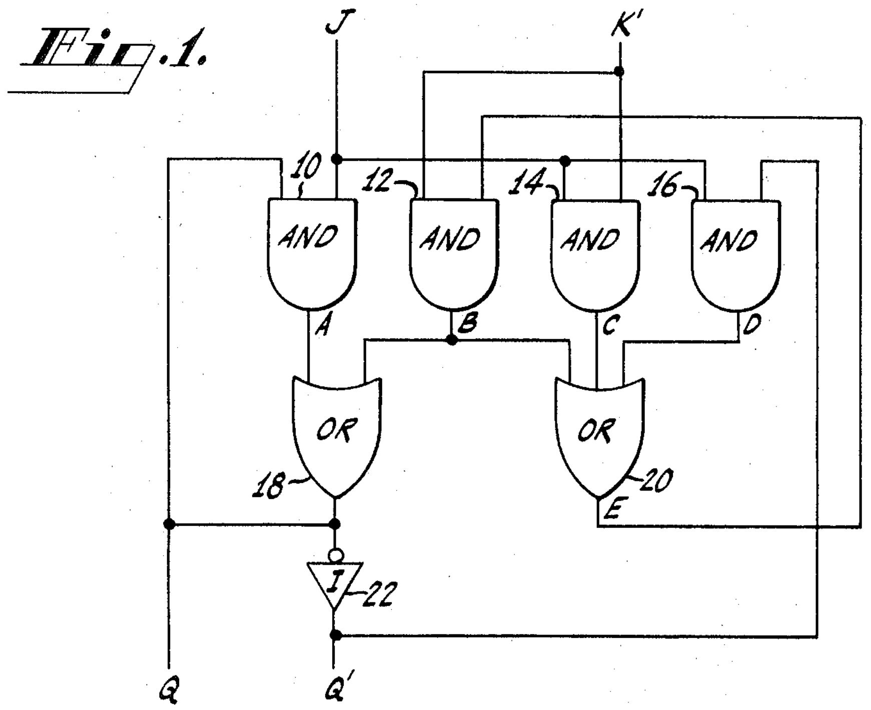
FIG. 1 is a logic diagram of one embodiment of the invention.

The circuit of the invention comprises direct-coupled logic elements. The principal types of logic elements are AND gates, OR gates, and Inverters.

The input and output signals of logical elements are two voltage levels, HIGH OR LOW. The values of 'one' and 'zero' are used in place of the voltage levels. One is usually associated with logical TRUE and 'zero', with logical FALSE. The voltage levels corresponding to 'one' and 'zero' are not fixed and depend on the type of circuits comprising the elements in a system.

In this description, the following conventions will be followed for purposes of clarity. The invention can be practiced, however, with all types of direct-coupled logical elements equivalent to AND and OR gates and inverters.

An AND gate is a logical element which has an output signal value of 'one ' only when all input signal values are 'one'. If any input signal value is 'zero', the output signal value is 'zero'.

An OR gate is a logical element which has an output signal value of 'one ' when any input signal value is 'one'. It has an output signal value of 'zero' only when all input signal values are 'zero'.

An inverter is a logical element having an output signal value of 'zero' whenever the input signal value is 'one'. It has an output signal value of 'one' whenever the input signal value is 'zero'. An inverter performs the logical operation of negation, i.e., it is a 'NOT' circuit.

A gate is activated when the input signal conditions cause an output signal value of 'one'.

An AND gate's output signal is the logical product of its input signal values. Thus, if any input signal value is 0, the result is 0. An OR gate's output signal is the logical sum of its inputs. Thus, if any input signal value is 1, the output signal value is 1. A logic network having a number of AND gates' outputs OR'ed together is a SUM OF Products network. A logical network ANDing a number of OR gates' outputs is a Product of Sums network.

A NAND (NOT-AND) gate is an AND gate with its output inverted. A NOR (NOT-OR) gate is an OR gate with its output inverted. It is well known in the art that a logic network can be constructed entirely of NAND or NOR gates. Sum of Products networks can be constructed of NAND gates merely by replacing all the AND gates, OR gates and inverters with NAND gates. Similarly, Product of Sums networks can be constructed of NOR gates by replacing all logical elements with NOR gates. The Sum of Products networks can be transformed into equivalent Product of Sums networks by inverting the network input and output signals.

The invention is described in terms of AND gates, OR gates, and inverters having signals of 1 represented by high voltage levels and signals of 0 represented by low voltage levels. By using the simple rules of transformation described above, the circuit of the invention can be constructed of other combination of different logic elements.

Each gate has a unit time delay, which is the difference in time between the application of the activating input signals and the change in the output caused by such input. The operation and simplicity of the invention depend on the unit time delay. The most advantageous implementation of the invention is in the form of an integrated circuit. Besides economy, the time delays of gates on a substrate chip can be made substantially the same so the requirement of approximately equal unit time delays can be easily fulfilled.

The embodiment of the invention shown in FIG. 1 employs six gates and an inverter. There are four AND gates 10, 12, 14 and 16 and two OR gates 18 and 20. The input signals are J and K'. The application of a J signal (that is, when J=1 and K=0 (K'=1) will activate the Q output causing it to remain high until a K' signal (J=0, K=1) inactivates the Q output. The Q' output is the complement (inverse) of the Q output.

The circuit implements the Boolean equations $$Q=QJ+EK' \text{ and} \quad (1)$$

$$E=EK'JK'+Q'J, \quad (2)$$

where E is the output signal of the OR gate 20.

In the reset state, that is, when Q=0 and Q'=1, an application of a J=1 input signal when K'=1 will cause the circuit to assume the set state, i.e., Q=1 and Q'=0. The application of a J=1 signal causes the output of the AND gates 14 and 16 to be activated. The J=1 input signal and the K'=1 input signal activate the output of the AND gate 14. At the same time, the J=1 input signal and the Q'=1 feedback signal activate the AND gate 16.

A unit time delay after the application of the J=1 signal, the outputs of the AND gates 14 and 16 activate the OR gate 20, the output of which furnishes a feedback signal of 'one' to the AND gate 12 after another unit time delay. The other input of the AND gate 12 is K'=1 so the AND gate 12 is activated two unit time delays after the application of the J=1 input signal.

The output of the AND gate 12 a unit time delay later activates the OR gate 18 and the OR gate 20. The OR gate 18 provides the Q output after another unit time delay. This causes the Q'=1 output to be Q'=0 after a unit time delay through the inverter 22. When the Q'=0, the AND gate 16 is deactivated. The output of the OR gate 20 is maintained, however, by the 'one' outputs of the AND gates 12 and 14. The circuit is in a stable state, i.e., no outputs are changing.

When the J=1 input signal is removed, that is, when J=0 and K'=1 the AND gate 14 is deactivated. The AND gate 12, however, remains activated by the 'one' feedback signal from the OR gate 20 and the K'=1 signal. The output signal of the AND gate 12 maintains the output signal of the OR gates 18 and 20. The output of the OR gate 18 is the Q=1 output signal and the E=1 output of the OR gate 20 serves as an enabling input to the AND gate 12.

Thus, it has been shown that the application of the J=1 signal while the circuit is in the stable reset state (during which K'=1) causes the circuit to assume the stable set state, which is maintained after the J=1 signal is removed (i.e., after J=0). The Q output is activated, that is, Q=1, four unit time delays after the application of the J=1 signal.

Figure 2:
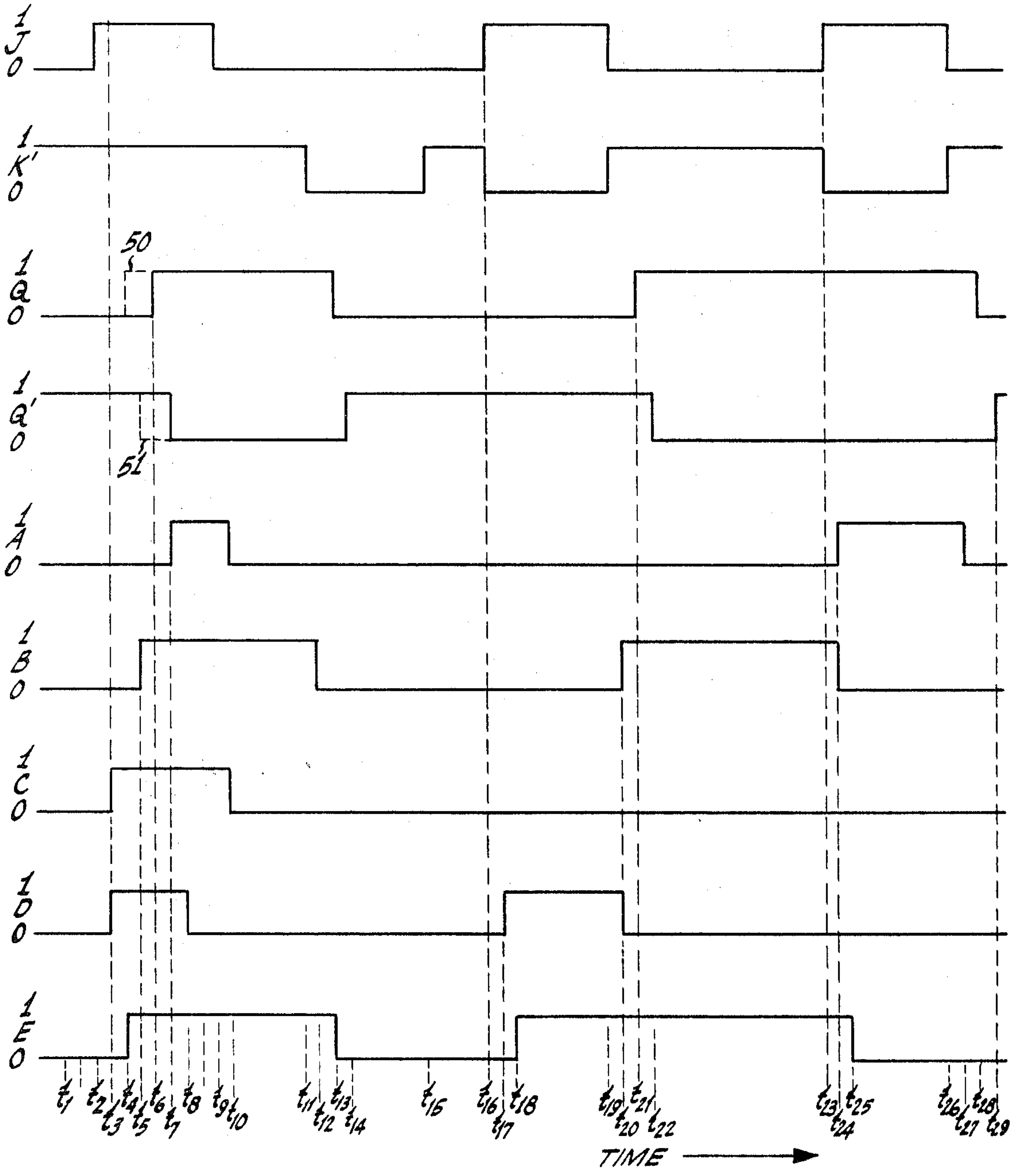
FIG. 2 is a timing diagram showing graphically the outputs of each gate with respect to time.

The time relations are shown graphically in FIG. 2. The values of the circuit variables are shown in FIG. 2 with respect to time. The output of the AND gates 10, 12, 14 and 16 are denoted by the letters A, B, C and D, respectively. The output of the OR gate 20 is E. The output of the OR gate 18 is Q and the output of the inverter 22 is Q'.

At the time period $t_1$, quiescent conditions of the circuit assumed when the circuit is in the reset state, are shown. The signals J. Q, A, B, C, D and E are low (0) and the signals K' and Q' are high (1).

At the time period $t_2$, a J=1 signal is applied to the circuit. One unit time delay later, at the time period $t_3$, the outputs C=1 and D=1. After a second unit time delay, at the time period $t_4$, the output E=1. A third unit time delay later, at the time period $t_5$, the output B=1 so that at the end of a fourth unit time delay, i.e., at the time period $t_6$, the output Q=1. Therefore, after a time interval equal to four unit time delays after the application of the J=1 signal, the output Q=1.

A unit time delay later, at the time period $t_7$, the output Q'=0. This causes the output D=0 a unit time delay later at the time period $t_8$. By this time, the outputs of all of the gates of the circuit shown in FIG. 1 have reached a stable state. The stable state is maintained until removal of the J input signal, i.e., J=0, at a subsequent time period, $t_9$. A unit time delay later, at the time period $t_{10}$, the output C=0.

After the time period $t_{10}$, the circuit is in the stable set state. The application of a J=1 signal while the circuit is in the set state will cause no change in the output condition of the circuit. The output of the AND gate 10 in FIG. 1 will change but it will not affect the circuit output Q when the circuit is in the set state. The OR gate 18, to which the output of AND gate 10 is connected, is already activated by the output of the AND gate 12. The circuit remains in the set state until the application of a K'=0 signal.

The application of a K'=0 signal when the circuit is in the quiescent stable set state will cause the circuit to assume the reset state.

In the quiescent stable set state, J=0 so A=0. However, the output of the AND gate 12 is maintained by the high feedback signal E=1 from the output of the OR gate 20 and the input signal K'=1. The application of a K'=0 input signal, that is, when K' goes low, disables the AND gate 12, causing its output to be low (0) a unit time delay later.

A unit time delay after the output of the AND gate 12 is low (B=0), the output of the OR gate 18 is low because neither input is primed. The output signal Q=0 and, a unit time delay later, the output Q'=1. After the output Q'=1, the circuit is in a stable state which is maintained until the removal of the K'=0 input signal (i.e., until K'=1). In this stable condition, and after K'=1, none of the gates are activated. Therefore, the output signals remain Q=0 and Q'=1. Thus, it has been shown that the application of a K'=0 input signal when J=0 causes the circuit to assume and maintain a stable reset state.

The timing diagram of FIG. 2 shows the time relationships of the reset operation just described. At the time period $t_{11}$, K'=0 a unit time delay later, at time period $t_{12}$, B=0. After another time delay, at the time period $t_{13}$, the circuit output Q=0 and after still another unit time delay, at the time period $t_{14}$, the output Q'=1. The outputs remain the same after K'=1 at the time period $t_{15}$.

The simultaneous application of the J and K' inputs, that is, when J=1 and K'=0, followed by the simultaneous removal of these signals, that is, by J=0, K'=1 will cause the stable state of the circuit to change. Initially it will be assumed that the circuit is in the stable reset state (Q=0, Q'=1) and show that the simultaneous application of the J and K' inputs causes the circuit to assume a stable set state.

The gates of the circuit in FIG. 1 are all activated in the stable reset condition. Simultaneous application of the J=1 and K'=0 inputs cause the output of the AND gate 16 to be activated (D=1). The output of the AND gate 16 results from the J=1 input signal and the Q'=1 feedback signal. A unit time delay after the application of the J=1 input signal, the output of the AND gate 16 is high and activates the OR gate 20. The output of the OR gate 20 is high (E=1) after another unit time delay and is fed back to an input of the AND gate 12. The other input of the AND gate 12 is the K'=0 input signal. The circuit remains in this state until the simultaneous removal of both the J and K' inputs.

When the input signals are removed, (J=0, K'=1) the signal K'=1 activates the AND gate 12. The other input of the AND gate 12 is high from the output signal of the OR gate 20 (E=1) which remains high after the removal of the J=1 input signal to the AND gate 16 because of the propagation delay of two unit time delays, i.e., through the AND gate 16 and the OR gate 20. Therefore, a unit time delay after K'=1, the output signal of the AND gate 12 is high (B=1), activating the OR gate 18 and the OR gate 20. The OR gate 20 output signal remains high providing an input signal to the AND gate 12. The output of the OR gate 18 is the Q=1 output of the circuit, corresponding to the stable set state.

In FIG. 2, the J=1 and K'=0 inputs are applied at the time period $t_{16}$. At the time period $t_{17}$ (a unit time delay later), the output D=1. After another unit time delay, at the time period $t_{18}$, the output E=1. Therefore, two unit time delays after the simultaneous application of J=1 and K'=0 input signals, the circuit is in a stable state with the output signals unchanged, i.e., Q=0 and Q'=1. This condition is maintained until the removal of both input signals at the time period $T_{19}$.

A unit time delay after the input signals have been removed, that is, at the time period $t_{20}$ J=0 and K'=1, the output B=1 and the output D=0. The E=1 output would change to E=0 a unit time delay later because D=0 but E=1 is caused by the input B=1 so that the result is output E=1 at the time period $T_{21}$. A unit time delay after B=1, the circuit output signal Q=1 at the time period $t_{21}$. A unit time delay later (at the time period $t_{22}$), the output Q'=0. The output B=1 because of the input signals K'=1 and E=1, the latter being maintained by the output B=1.

In the quiescent stable set state, the output signal of the AND gate 12 in FIG. 1 is high (B=1), activating the OR gates 18 and 20. The output signal of the OR gate 20, in conjunction with the K'=1 signal, maintains the output signal of the AND gate 12 and the output signal of the OR gate 18 provides the circuit output signal Q=1.

The simultaneous application of the J and K' input signals (J=1, K'=0) when the circuit is in its stable set state followed by the return of the input signals to J=0, K'=1 changes the circuit to its reset state. The K'=0 signal disables the AND gate 12 causing the output signal B=0 a unit time delay later. Consequently, a unit time delay later, the output signal of the OR gate 20 is low (E=0).

The output signal of the AND gate 10 is activated by the J=1 input signal and the Q=1 feedback signal. The output signal of the AND gate 10 (A=1) enables the OR gate 18 before its output goes low as a result of the output signal of the AND gate 12 going low (B=0) and maintains the circuit output signal Q=1. The circuit output is maintained in the set state while the input signals J=1 and K'=0.

When the J and K' signals are simultaneously removed, (J=0, K'=1) the output signal of the AND gate 10 goes low (A=0) a unit time delay later. After a subsequent unit time delay, the output signal Q=0. After another unit time delay, the circuit output signal Q'=1. The circuit is then in the stable reset state with none of the gates in the circuit enabled.

Thus, it has been shown that the simultaneous application of the J and K' inputs followed by their simultaneous removal causes the circuit to assume the opposite stable state.

In FIG. 2, at the time period $t_{23}$, the J=1 and K'=0 input signals are applied simultaneously. A unit time delay later, at the time period $t_{24}$, the output A=1 and the output B=0. After another unit time delay at the time period $t_{25}$, the output E=0 because the output B=0. The output Q=1, however, is maintained by the output A=1. The circuit remains in this stable condition until the time period $t_{26}$ when the J and K' inputs are removed simultaneously, i.e., J=0, K'=1. After a unit time delay, at the time period $t_{27}$, the output A=0 causing the output Q=0 another unit time delay later at the time period $t_{28}$. After another unit time delay, the circuit output Q'= 1 at the time period $t_{29}$.

In the description of the operation of the embodiment of the invention shown in FIG. 1, when the circuit was changed from the stable reset state to the stable set state by application of the J=1 input signal, it was noted that the time delay was four unit time delays between the application of the J=1 input signal and the change in the circuit output signal Q=1. In some applications, it may be desirable to decrease the delay between the application of the J=1 input signal and the set output signal Q=1.

Figure 3:
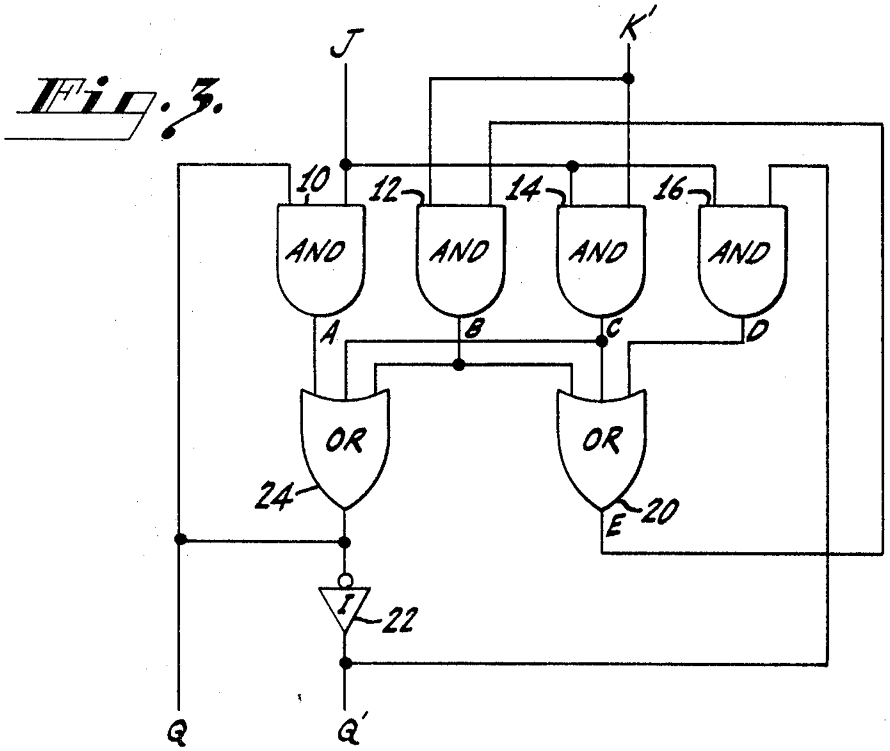
FIG. 3 is a logic diagram of another embodiment of the invention.

FIG. 3 shows an embodiment of the invention in which the output signal of the AND gate 14 is coupled to an input of an OR gate 24, which replaces the OR gate 18 in FIG. 1. The operation of the circuit as shown in FIG. 3 is the same as that described for FIG. 1 except that the change of the circuit output signal Q=1 only two unit time delays after the application of an input signal J=1. In the timing diagram of FIG. 2, the Q=1 output signal is shown by the dotted line 50 as occurring at the time period $t_4$ when the embodiment of FIG. 3 is used. The change in the output Q'=0 occurs at the time period $t_5$ as shown by the dotted line 51 in FIG. 2.

The operation of the circuit shown in FIG. 3 is, as stated above, similar to the circuit shown in FIG. 1. The circuit of FIG. 3 is assumed to be in the quiescent stable reset state. The application of a J=1 input signal causes the output signals of the AND gates 14 and 16 to be high (C=D=1) after a unit time delay. The high output signal of the AND gate 14 (C=1) activates the OR gates 20 and 24. The output signal of the OR gate 24 is the Q=1 output signal of the circuit a unit time delay after the input C=1. Thus, the output signal Q changes within two unit time delays of the application of the J=1 input signal. This eliminates two unit time delays.

The operation of the circuit of FIG. 3 is otherwise exactly the same as the operation of the circuit shown in FIG. 1. However, it has been showed to be an improvement over the embodiment shown in FIG. 1 because of the reduction of the delay between the set input signal J=1 and the change in the circuit output signal Q=1.

The gating circuits shown in FIG. 1 and FIG. 3 must have no loss, i.e., a loop gain of at least one. For instance, the use of all diode gates to implement the invention is precluded because of the feedback circuits. As mentioned earlier, however, the circuits can be implemented using NAND gates or NOR gates. The transformation requires no change in the Boolean equations.

The invention described has been shown to operate as an unclocked J—K flip-flop. The advantage of the invention is the simplicity and reduction in the number of gates required. The simplicity of the operation of the gates is accomplished by taking advantage of the fact that there is a finite propagation delay through each gate. The circuits of the invention are useful in a synchronous logic circuitry.

I claim:

1. The combination comprising:

first logic gating means responsive to inputs J and K' and to feedback signals E, Q, and Q' for producing signals

A=JQ,

B=K'E,

C=JK',

D=Q'J;

second logic gating means responsive to said A, B, C, and D signals for producing the feedback signals

Q=A+B,

E=B+C+D; and means for deriving the feedback signal Q' from the feedback signal Q.

2. The combination as claimed in claim 1 wherein the second logic gating means produces the feedback signals Q=A+B+C and E=B+C+D.

3. The combination as claimed in claim 1 wherein the gating means are inverting gates.

4. The combination as claimed in claim 2 wherein the gating means are inverting gates.

5. A bistable logic circuit having first and second input means and complementary output means, comprising:

four logic AND gating means, each having two inputs and an output;

a first logic OR gating means having two inputs and an output;

a second logic OR gating means having three inputs and an output;

means for coupling the first circuit input means to one input each of the first, third, and fourth AND gating means;

means for coupling the second circuit input means to one input each of the second and third AND gating means;

means for coupling the outputs of the first and second AND gating means to the inputs of said first OR gating means;

means for coupling the output of the second, third and fourth AND gating means to the inputs of said second OR gating means;

feedback means for coupling the output of said first OR gating means to the other input of the first AND gating means;

feedback means for coupling the output of the second OR gating means to the other input of the second AND gating means;

inverting means having an input coupled to the output of the first OR gating means and an output for providing the logical complement of said first OR gating means;

feedback means for coupling the output of the inverter means to the other input of the fourth AND gating means;

means for coupling the output of said first OR gating means to one circuit output means; and means for coupling the output of the inverter to the other circuit output means.

6. The logic circuit as claimed in claim 5 wherein the first logic OR gating means has three inputs and an output and including means for coupling the output of the third AND gating means to the third input of the first OR gate.

7. The logic circuit of claim 5 wherein all the gates are inverting gates.

8. The logic circuit of claim 6 wherein all the gates are inverting gates.